(12) United States Patent
Zhang et al.

(10) Patent No.: US 10,719,080 B2
(45) Date of Patent: Jul. 21, 2020

(54) AERIAL SYSTEM AND DETACHABLE HOUSING

(71) Applicant: Hangzhou Zero Zero Technology Co., Ltd, Chaoyang District, Beijing (CN)

(72) Inventors: Lei Zhang, Beijing (CN); Zhaozhe Wang, Beijing (CN); Tong Zhang, Beijing (CN)

(73) Assignee: Hangzhou Zero Zero Technology Co., Ltd., Hangzhou, Zhejiang Province (CN)

( * ) Notice: Subject to any disclaimer, the term of this patent is extended or adjusted under 35 U.S.C. 154(b) by 0 days.

(21) Appl. No.: 15/889,863

(22) Filed: Feb. 6, 2018

(65) Prior Publication Data

US 2018/0164819 A1   Jun. 14, 2018

Related U.S. Application Data

(63) Continuation-in-part of application No. 15/610,851, filed on Jun. 1, 2017, now Pat. No. 10,222,800, which
(Continued)

(30) Foreign Application Priority Data

Aug. 10, 2015  (CN) .......................... 2015 1 0487412
Aug. 10, 2015  (CN) .......................... 2015 1 0487415
(Continued)

(51) Int. Cl.
*G05D 1/00*  (2006.01)
*B64C 39/02*  (2006.01)
(Continued)

(52) U.S. Cl.
CPC ......... *G05D 1/0088* (2013.01); *B64C 39/024* (2013.01); *B64D 45/00* (2013.01);
(Continued)

(58) Field of Classification Search
CPC .................................................. G05D 1/0088
See application file for complete search history.

(56) References Cited

U.S. PATENT DOCUMENTS 2,535,527 A   12/1950  Barkley
3,083,935 A    4/1963  Piasecki
(Continued)

FOREIGN PATENT DOCUMENTS

CH         333967      11/1958
CN       101976078     2/2011
(Continued)

OTHER PUBLICATIONS

International Search Report for PCT Application No. PCT/IB2018/000174 dated Jun. 27, 2018.
(Continued)

*Primary Examiner* — Alex C Dunn
(74) *Attorney, Agent, or Firm* — Jeffrey Schox; Samuel Rosenthal

(57) ABSTRACT

An aerial system, preferably including one or more housings. A housing for an aerial system, preferably including: a first and second piece that cooperatively surround one or more propellers of the aerial system; and a retention mechanism that removably couples the first piece to the second piece. A method for aerial system operation, preferably including attaching and/or detaching housing pieces of the aerial system.

18 Claims, 6 Drawing Sheets

Related U.S. Application Data is a continuation of application No. 15/349,749, filed on Nov. 11, 2016, now Pat. No. 9,836,053, and a continuation-in-part of application No. PCT/CN2015/099339, filed on Dec. 29, 2015, application No. 15/889,863, which is a continuation-in-part of application No. 15/610,851, filed on Jun. 1, 2017, now Pat. No. 10,222,800, which is a continuation of application No. 15/349,749, filed on Nov. 11, 2016, now Pat. No. 9,836,053, which is a continuation-in-part of application No. PCT/CN2016/070579, filed on Jan. 11, 2016, and a continuation-in-part of application No. PCT/CN2016/070583, filed on Jan. 11, 2016, and a continuation-in-part of application No. PCT/CN2016/070581, filed on Jan. 11, 2016.

(60) Provisional application No. 62/353,337, filed on Jun. 22, 2016, provisional application No. 62/326,600, filed on Apr. 22, 2016, provisional application No. 62/099,512, filed on Jan. 4, 2015, provisional application No. 62/455,755, filed on Feb. 7, 2017.

(30) Foreign Application Priority Data

| Aug. 10, 2015 | (CN) | ............... 2015 1 0487744 |
|---|---|---|
| Aug. 31, 2015 | (CN) | ............... 2015 1 0547151 |
| Dec. 29, 2015 | (WO) | ............... PCT/CN2015/099339 |
| Jan. 11, 2016 | (WO) | ............... PCT/CN2016/070579 |
| Jan. 11, 2016 | (WO) | ............... PCT/CN2016/070581 |
| Jan. 11, 2016 | (WO) | ............... PCT/CN2016/070583 |

(51) Int. Cl.
  *G05D 1/04* (2006.01)
  *B64F 5/60* (2017.01)
  *B64D 45/00* (2006.01)

(52) U.S. Cl.
  CPC ............... *B64F 5/60* (2017.01); *G05D 1/042* (2013.01); *B64C 2201/027* (2013.01); *B64C 2201/141* (2013.01); *B64C 2201/18* (2013.01)

(56) References Cited

U.S. PATENT DOCUMENTS

| 4,043,421 | A | | 8/1977 | Smith |
| 5,351,913 | A | | 10/1994 | Cycon et al. |
| 5,419,514 | A | | 5/1995 | Duncan |
| 5,503,351 | A | | 4/1996 | Vass |
| 5,672,086 | A | | 9/1997 | Dixon |
| 5,890,441 | A | * | 4/1999 | Swinson ............ B64C 29/0025 244/12.1 |
| 6,234,426 | B1 | * | 5/2001 | Renken ............ B64G 1/10 244/159.4 |
| 6,260,796 | B1 | | 7/2001 | Klingensmith |
| 6,270,038 | B1 | | 8/2001 | Cycon et al. |
| 6,293,491 | B1 | | 9/2001 | Wobben |
| 6,547,180 | B1 | | 4/2003 | Cassidy |
| 6,688,936 | B2 | | 2/2004 | Davis |
| 6,694,228 | B2 | | 2/2004 | Rios |
| 6,745,977 | B1 | | 6/2004 | Long et al. |
| 6,773,321 | B1 | | 8/2004 | Urquiaga |
| 6,928,363 | B2 | | 8/2005 | Sankrithi |
| 7,011,274 | B1 | | 3/2006 | Hardoin |
| 7,341,223 | B2 | | 3/2008 | Chu |
| 7,343,232 | B2 | | 3/2008 | Duggan et al. |
| 7,542,828 | B2 | | 6/2009 | Steele et al. |
| 7,712,701 | B1 | | 5/2010 | Ehrmantraut et al. |
| 7,874,513 | B1 | * | 1/2011 | Smith ............ B64C 11/001 244/12.4 |
| 8,177,159 | B2 | | 5/2012 | Khakimov et al. |
| 8,275,412 | B2 | | 9/2012 | Alameh et al. |
| 8,346,480 | B2 | | 1/2013 | Trepagnier et al. |
| 8,430,709 | B1 | | 4/2013 | Wong |
| 8,473,123 | B2 | | 6/2013 | Sun et al. |
| 8,564,148 | B1 | | 10/2013 | Novak |
| 8,590,829 | B2 | | 11/2013 | Keidar et al. |
| 8,620,493 | B2 | | 12/2013 | Hughes et al. |
| 8,733,690 | B2 | * | 5/2014 | Bevirt ............ B64C 29/0033 244/12.4 |
| 8,903,568 | B1 | | 12/2014 | Wang et al. |
| 8,907,846 | B2 | | 12/2014 | Sharawi et al. |
| 8,938,160 | B2 | | 1/2015 | Wang |
| 8,958,928 | B2 | | 2/2015 | Seydoux et al. |
| 9,004,393 | B2 | | 4/2015 | Barrett-Gonzales |
| 9,004,396 | B1 | * | 4/2015 | Colin ............ B64D 47/08 244/17.23 |
| 9,057,273 | B2 | | 6/2015 | Wang et al. |
| 9,061,763 | B1 | * | 6/2015 | Christensen ............ A63H 17/28 |
| 9,079,115 | B2 | | 7/2015 | Huang et al. |
| 9,085,355 | B2 | | 7/2015 | Delorean |
| 9,108,729 | B2 | | 8/2015 | Duggan et al. |
| 9,126,693 | B1 | | 9/2015 | Shi et al. |
| D741,751 | S | | 10/2015 | Klaptocz et al. |
| 9,174,732 | B2 | | 11/2015 | Jensen et al. |
| 9,266,609 | B1 | | 2/2016 | Kunz |
| D751,025 | S | | 3/2016 | Howell et al. |
| 9,277,130 | B2 | | 3/2016 | Wang et al. |
| 9,290,267 | B2 | | 3/2016 | Metreveli |
| 9,305,317 | B2 | | 4/2016 | Grokop et al. |
| 9,317,036 | B2 | | 4/2016 | Wang et al. |
| 9,321,531 | B1 | * | 4/2016 | Takayama ............ B64D 1/12 |
| 9,346,543 | B2 | | 5/2016 | Kugelmass |
| 9,364,930 | B2 | | 6/2016 | Hethcock et al. |
| 9,402,008 | B2 | | 7/2016 | Chen et al. |
| 9,429,141 | B2 | | 8/2016 | Vander Lind et al. |
| 9,457,899 | B2 | | 10/2016 | Duffy et al. |
| 9,493,235 | B2 | | 11/2016 | Zhou et al. |
| 9,527,597 | B1 | | 12/2016 | Sada et al. |
| 9,550,567 | B1 | | 1/2017 | Erdozain et al. |
| 9,567,076 | B2 | | 2/2017 | Zhang |
| 9,589,595 | B2 | | 3/2017 | Gao et al. |
| 9,625,907 | B2 | | 4/2017 | Hu et al. |
| 9,630,710 | B2 | | 4/2017 | Hutson |
| 9,635,248 | B2 | | 4/2017 | Yang et al. |
| 9,688,400 | B2 | | 6/2017 | Hutson |
| 9,696,725 | B2 | | 7/2017 | Wang |
| 9,733,644 | B2 | | 8/2017 | Levien et al. |
| 9,760,072 | B2 | | 9/2017 | Hall et al. |
| 9,764,829 | B1 | * | 9/2017 | Beckman ............ B64C 15/14 |
| 9,815,552 | B1 | | 11/2017 | Welsh |
| 9,828,094 | B2 | | 11/2017 | McMillion |
| 9,836,053 | B2 | | 12/2017 | Wang et al. |
| 9,840,339 | B1 | | 12/2017 | Obrien et al. |
| 9,842,505 | B2 | | 12/2017 | Wang et al. |
| 9,856,016 | B2 | | 1/2018 | Mueller et al. |
| 9,889,930 | B2 | | 2/2018 | Welsh et al. |
| 9,902,491 | B2 | * | 2/2018 | Chan ............ B64C 27/08 |
| 9,902,493 | B2 | | 2/2018 | Simon et al. |
| 9,908,632 | B1 | | 3/2018 | Kimchi et al. |
| 9,914,538 | B2 | | 3/2018 | Yu |
| 9,919,797 | B2 | * | 3/2018 | Chan ............ B64C 39/024 |
| 10,006,360 | B2 | * | 6/2018 | Schmidt ............ F02B 55/02 |
| 10,124,890 | B2 | * | 11/2018 | Sada-Salinas ............ B64C 29/0025 |
| 10,145,243 | B2 | * | 12/2018 | Ribbens ............ F02B 53/02 |
| 10,216,197 | B2 | | 2/2019 | Zhang et al. |
| 10,347,140 | B2 | | 7/2019 | Kneuper et al. |
| 2002/0142699 | A1 | | 10/2002 | Davis |
| 2003/0192989 | A1 | | 10/2003 | Owen et al. |
| 2003/0212478 | A1 | | 11/2003 | Rios |
| 2007/0262195 | A1 | | 11/2007 | Bulaga et al. |
| 2008/0054121 | A1 | | 3/2008 | Yoeli |
| 2009/0308347 | A1 | * | 12/2009 | Hathaway ............ F01C 1/28 123/242 |
| 2010/0096493 | A1 | | 4/2010 | Khakimov et al. |
| 2010/0140416 | A1 | | 6/2010 | Ohanian et al. |
| 2011/0164108 | A1 | | 7/2011 | Bates et al. |
| 2011/0221692 | A1 | | 9/2011 | Seydoux et al. |
| 2011/0226892 | A1 | | 9/2011 | Crowther et al. |
| 2012/0056040 | A1 | | 3/2012 | Brotherton-Ratcliffe et al. |

(56) References Cited

U.S. PATENT DOCUMENTS

| | | | |
|---|---|---|---|
| 2012/0078451 A1 | 3/2012 | Ohtomo et al. | |
| 2012/0158215 A1 | 6/2012 | Sun et al. | |
| 2012/0200703 A1 | 8/2012 | Nadir et al. | |
| 2012/0248259 A1 | 10/2012 | Page et al. | |
| 2012/0267472 A1 | 10/2012 | Pratzovnick et al. | |
| 2012/0271461 A1 | 10/2012 | Spata | |
| 2013/0134254 A1 | 5/2013 | Moore | |
| 2014/0025234 A1 | 1/2014 | Levien et al. | |
| 2014/0032034 A1 | 1/2014 | Raptopoulos et al. | |
| 2014/0037278 A1 | 2/2014 | Wang | |
| 2014/0061362 A1 | 3/2014 | Olm et al. | |
| 2014/0061376 A1 | 3/2014 | Fisher et al. | |
| 2014/0099853 A1 | 4/2014 | Condon et al. | |
| 2014/0138477 A1 | 5/2014 | Keennon et al. | |
| 2014/0142787 A1 | 5/2014 | Tillotson et al. | |
| 2014/0158816 A1 | 6/2014 | Delorean | |
| 2014/0257595 A1 | 9/2014 | Tillmann | |
| 2014/0259628 A1 | 9/2014 | Hethcock et al. | |
| 2014/0313345 A1 | 10/2014 | Conard et al. | |
| 2014/0314565 A1 | 10/2014 | Ghapgharan et al. | |
| 2014/0374532 A1 | 12/2014 | Duffy et al. | |
| 2014/0376170 A1 | 12/2014 | Richard et al. | |
| 2015/0129711 A1 | 5/2015 | Caubel | |
| 2015/0160658 A1 | 6/2015 | Reedman et al. | |
| 2015/0167492 A1 | 6/2015 | Collette et al. | |
| 2015/0226575 A1 | 8/2015 | Rambo | |
| 2015/0266570 A1 | 9/2015 | Metreveli | |
| 2015/0274294 A1 | 10/2015 | Dahlstrom | |
| 2016/0023755 A1 | 1/2016 | Elshafei et al. | |
| 2016/0041628 A1 | 2/2016 | Verma | |
| 2016/0070265 A1 | 3/2016 | Liu et al. | |
| 2016/0086497 A1 | 3/2016 | Williams et al. | |
| 2016/0093225 A1 | 3/2016 | Williams et al. | |
| 2016/0101856 A1 | 4/2016 | Kohstall | |
| 2016/0122015 A1 | 5/2016 | Hutson | |
| 2016/0122038 A1 | 5/2016 | Fleischman et al. | |
| 2016/0144954 A1 | 5/2016 | Daigle | |
| 2016/0152327 A1 | 6/2016 | Bertels | |
| 2016/0171896 A1 | 6/2016 | Buchmueller et al. | |
| 2016/0176520 A1 | 6/2016 | Goldstein | |
| 2016/0200415 A1 | 7/2016 | Cooper | |
| 2016/0207368 A1 | 7/2016 | Gaonjur | |
| 2016/0221671 A1 | 8/2016 | Fisher et al. | |
| 2016/0221683 A1 | 8/2016 | Roberts et al. | |
| 2016/0229530 A1 | 8/2016 | Welsh et al. | |
| 2016/0229534 A1 | 8/2016 | Hutson | |
| 2016/0280369 A1 | 9/2016 | Pounds | |
| 2016/0283774 A1 | 9/2016 | Buchanan et al. | |
| 2016/0286128 A1 | 9/2016 | Zhou | |
| 2016/0340035 A1 | 11/2016 | Duru | |
| 2016/0378105 A1* | 12/2016 | Tanigawa | B08B 5/04 134/18 |
| 2016/0378108 A1* | 12/2016 | Paczan | B64C 37/02 705/330 |
| 2017/0011333 A1 | 1/2017 | Greiner et al. | |
| 2017/0039859 A1 | 2/2017 | Hu et al. | |
| 2017/0057630 A1 | 3/2017 | Schwaiger | |
| 2017/0057650 A1 | 3/2017 | Walter-Robinson | |
| 2017/0073070 A1 | 3/2017 | Xing | |
| 2017/0129603 A1 | 5/2017 | Raptopoulos et al. | |
| 2017/0144757 A1 | 5/2017 | Hall et al. | |
| 2017/0152035 A1 | 6/2017 | Zhao et al. | |
| 2017/0152060 A1 | 6/2017 | Morisawa | |
| 2017/0166304 A1 | 6/2017 | Erdozain et al. | |
| 2017/0217585 A1* | 8/2017 | Hulsman | B64C 39/024 |
| 2017/0225783 A1 | 8/2017 | Fisher et al. | |
| 2017/0291697 A1 | 10/2017 | Kornatowski et al. | |
| 2017/0291704 A1 | 10/2017 | Alegria | |
| 2017/0297707 A1 | 10/2017 | Rollefstad et al. | |
| 2017/0313418 A1 | 11/2017 | Yoon | |
| 2017/0322563 A1 | 11/2017 | Kohstall | |
| 2017/0349264 A1 | 12/2017 | Nilson et al. | |
| 2017/0359106 A1 | 12/2017 | John Wilson et al. | |
| 2018/0099745 A1 | 4/2018 | Welsh et al. | |
| 2018/0141650 A1 | 5/2018 | Hampton et al. | |
| 2018/0141672 A1 | 5/2018 | Bevirt et al. | |
| 2018/0155018 A1 | 6/2018 | Kovac et al. | |
| 2018/0194463 A1 | 7/2018 | Hasinski et al. | |
| 2018/0208301 A1 | 7/2018 | Ye | |
| 2019/0210719 A1 | 7/2019 | Goldstein et al. | |

FOREIGN PATENT DOCUMENTS

| | | |
|---|---|---|
| CN | 102273083 | 12/2011 |
| CN | 104253887 | 12/2014 |
| CN | 204406209 | 3/2015 |
| CN | 104486543 | 4/2015 |
| CN | 104679013 | 6/2015 |
| CN | 104685436 | 6/2015 |
| CN | 104991561 | 10/2015 |
| CN | 105035318 A | 11/2015 |
| CN | 105116909 | 12/2015 |
| CN | 105182986 | 12/2015 |
| CN | 204822682 U | 12/2015 |
| CN | 105425952 | 3/2016 |
| CN | 105836120 A | 8/2016 |
| CN | 106335635 A | 1/2017 |
| EP | 1901153 | 3/2008 |
| EP | 2731271 | 5/2014 |
| JP | 2015117003 A | 6/2015 |
| WO | 112578 | 10/2006 |
| WO | 054937 | 4/2009 |
| WO | 2015085598 A1 | 6/2015 |
| WO | 080598 | 5/2016 |
| WO | 2016107529 A1 | 7/2016 |
| WO | 2016112124 A2 | 7/2016 |

OTHER PUBLICATIONS

EP15875205.5 Search Report dated Dec. 22, 2017, 7 pages.

"Korean Office Action for application No. 10-2018-7021868 dated Sep. 27, 2019."

* cited by examiner

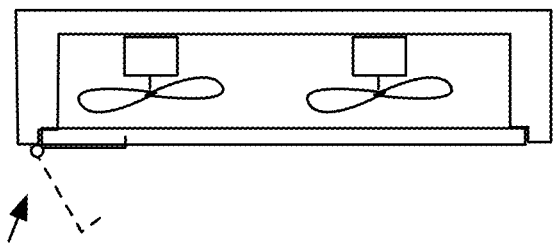
120   FIGURE 17
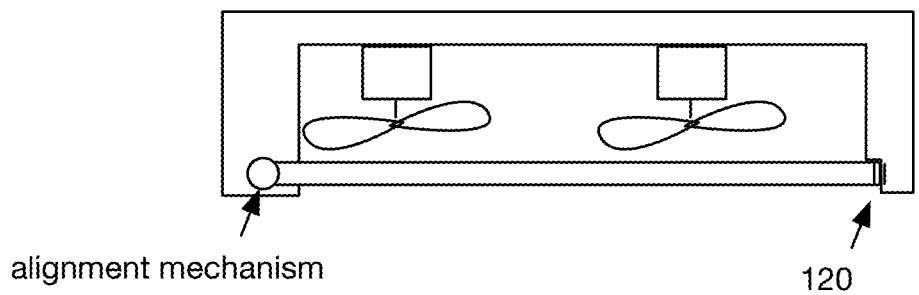
alignment mechanism                    120
FIGURE 18
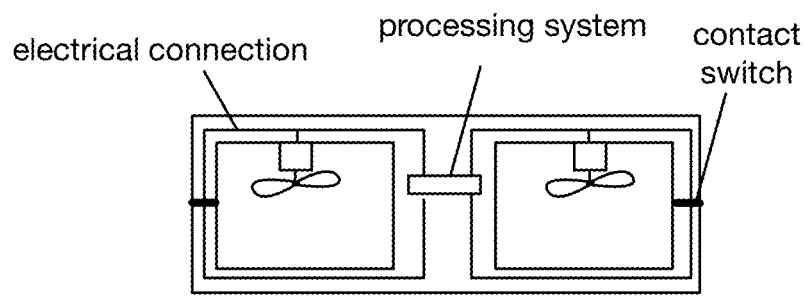
FIGURE 19

AERIAL SYSTEM AND DETACHABLE HOUSING

CROSS-REFERENCE TO RELATED APPLICATIONS

This application is a continuation-in-part of U.S. patent application Ser. No. 15/610,851, filed 1 Jun. 2017, which is a continuation of U.S. patent application Ser. No. 15/349,749, filed 11 Nov. 2016, which claims the benefit of U.S. Provisional Application No. 62/353,337, filed 22 Jun. 2016, and U.S. Provisional Application No. 62/326,600, filed 22 Apr. 2016, and which is a continuation-in-part of International Applications: PCT/CN2015/099339 filed 29 Dec. 2015, which claims the priority of U.S. patent application Ser. No. 62/099,512 filed 4 Jan. 2015 and Chinese Patent Application No. 201510547151.3 filed 31 Aug. 2015; PCT/CN2016/070579 filed 11 Jan. 2016, which claims the priority of Chinese Patent Application No. 201510487415.0 filed 10 Aug. 2015, PCT/CN2016/070583 filed 11 Jan. 2016, which claims the priority of Chinese Patent Application No. 201510487744.5 filed 10 Aug. 2015, and PCT/CN2016/070581 filed 11 Jan. 2016, which claims the priority of Chinese Patent Application No. 201510487412.7 filed 10 Aug. 2015; all of which are incorporated in their entireties by this reference.

This application claims the benefit of U.S. Provisional Application Ser. No. 62/455,755, filed on 7 Feb. 2017, which is incorporated in its entirety by this reference.

TECHNICAL FIELD

This invention relates generally to the aerial system field, and more specifically to a new and useful modular housing for an aerial system in the aerial system field.

BRIEF DESCRIPTION OF THE FIGURES

FIG. 17 is an example of a latch retention mechanism.

FIG. 18 is an example of a tongue and groove alignment mechanism.

FIG. 19 is an example of the contact switch and the electrical connections to the aerial system processing system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 2:
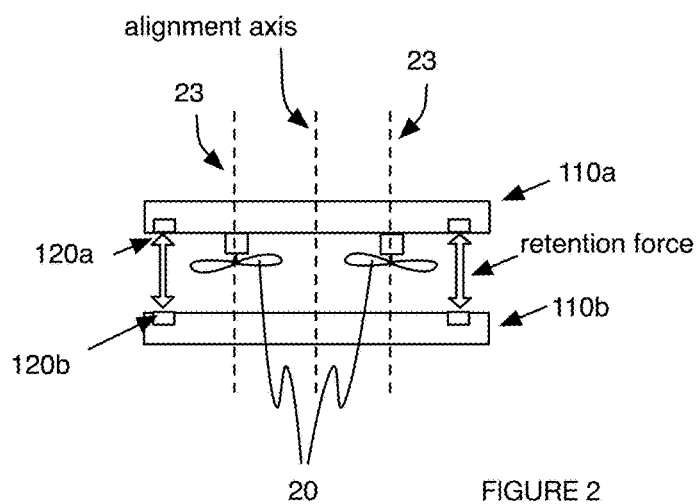
FIG. 2 is a sectional view of a variation of the detachable housing.

The detachable housing 100 is preferably a housing of an aerial system 1 (e.g., as described in U.S. application Ser. No. 15/349,749, titled "System and Method for Automated Aerial System Operation", and/or PCT Application number PCT/CN2015/099339, titled "Fully Protected Drone", both of which are incorporated in their entireties by this reference), but can additionally or alternatively be a housing for any other suitable system. The detachable housing 100 preferably includes: a first housing piece 110a and second housing piece 110b that cooperatively surround the propellers of the aerial system and a retention mechanism 120 that removably couples the first piece to the second piece (e.g., as shown in FIG. 2). The detachable housing can additionally or alternatively include an alignment mechanism, a shear-resistant mechanism, a removal mechanism, or any other suitable component or feature.

Figure 1:
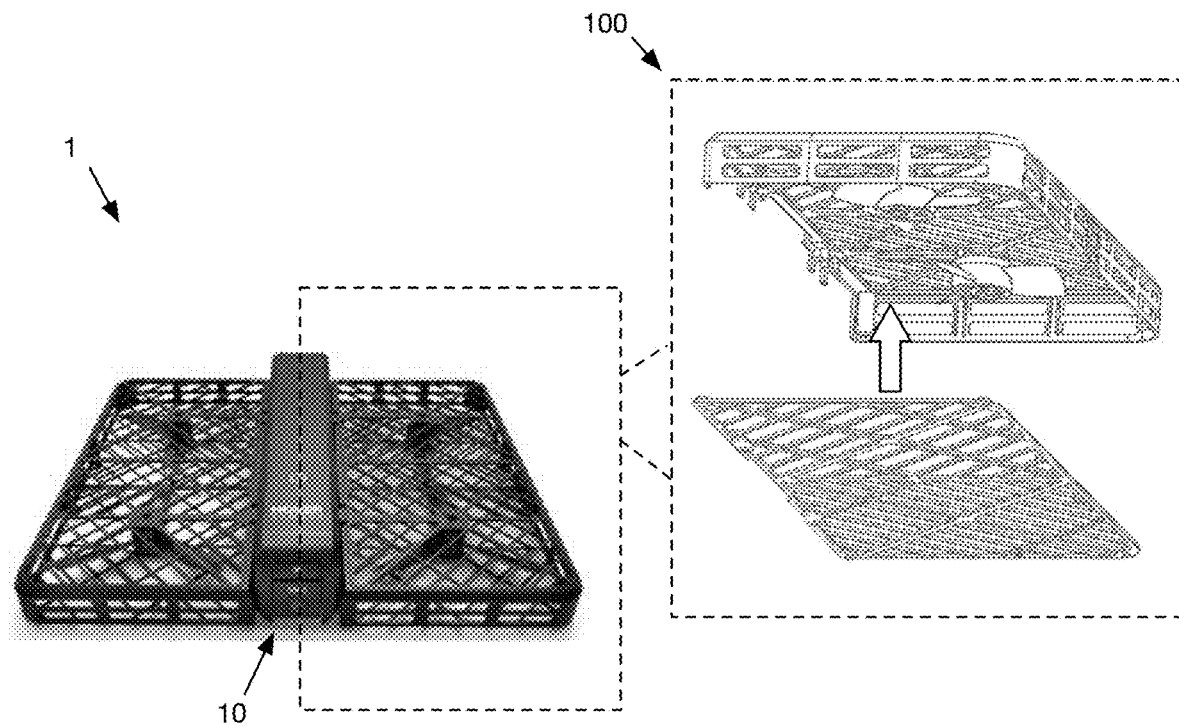
FIG. 1 is a perspective view of a variation of an aerial system with a detachable housing.

The detachable housing can be particularly useful in rotorcraft (e.g., drone systems such as quadcopters) with one or more protective housings that surround (e.g., fully surrounds, encloses, etc.) one or more the rotors (e.g., as shown in FIG. 1). Such protective housings can, for example, enable a user (e.g., a user's hand) to grab the drone (e.g., at a grab region of the housing) while the propellers are still spinning. The detachable housing preferably functions to enable user access to the housing interior, which can be desirable for damaged and/or worn propeller removal and/or replacement.

In operation, the user preferably applies an opening force greater than the retention force to the first and/or second piece to open the housing, which gives the user access to the propellers within the housing interior. The opening force can be a lever force (e.g., applied to an edge of the first and/or second piece), a linear force (e.g., to push out a pin), a spring force, or be any other suitable force. After housing interior maintenance (e.g., propeller replacement, motor maintenance, etc.) is complete, the user can close the housing by aligning the first piece with the second piece. The first piece is preferably automatically coupled to the second piece upon alignment, but the user can optionally apply a coupling force (e.g., close a latch, etc.) to retain the second piece against the first piece. The detachable housing is preferably retained in the closed position by the retention mechanism during aerial system flight and/or when aerial system perturbations (e.g., bumps) are encountered, but can alternatively operate in any other suitable configuration during aerial system flight. However, the detachable housing can be otherwise used.

The aerial system 1 (e.g., aircraft) can include: one or more housings (e.g., detachable housings 100), one or more rotors 20, a processing system, sensors (e.g., gyroscope, accelerometer, contact switch, etc.), a communications system, a navigation system (e.g., camera systems, rangefinding systems, etc.), outputs (e.g., lights, speakers, etc.), inputs (e.g., capacitive touch sensors, accelerometers, etc.), and/or any other suitable components.

Each rotor 20 preferably includes a propeller 21 and a rotor driver 22 (e.g., motor, transmission, driveshaft, etc.). The propeller is preferably rotationally coupled about a rotor axis 23 to the housing (e.g., by the rotor driver), wherein the rotor driver causes the propeller to rotate about the rotor axis (e.g., in response to control signals from the processing system). The rotor axes are preferably substantially vertical (e.g., normal a broad face of the aerial system), but can alternatively be off-vertical (e.g., tilted inward or outward) and/or have any other suitable orientation.

In one variation, the aerial system includes a main body 10 housing the processing system, sensors, and communication system and a detachable housing attached to a side of the main body. The housing preferably is rotatably mounted (e.g., along the interface) to the main body (e.g., about an axis, such as an axis substantially parallel a longitudinal axis, broad face, and/or horizontal edge of the main body; an axis substantially normal a rotor axis, vertical axis, broad face, and/or vertical edge of the aerial system; etc.), but can alternatively be statically mounted and/or mounted in any other suitable manner. The aerial system can include a first and second housing mounted on either side of the main body, include a single housing spanning either side of the main body, or include any other suitable housing otherwise mounted to the body. In a specific example, the first and second housing mounted on either side of the main body rotate relative to the main body, such that the aerial system can be folded into a smaller footprint.

The first and second piece of the detachable housing preferably function to cooperatively surround the propellers of the aerial system. The housing preferably defines a first and second opposing broad face connected by sidewalls, but can be otherwise defined. The first and/or second opposing broad face can be planar, convex, concave, or otherwise shaped. The first and second piece preferably join at an interface to cooperatively form the detachable housing, but can join at any other suitable interface.

Figure 3:
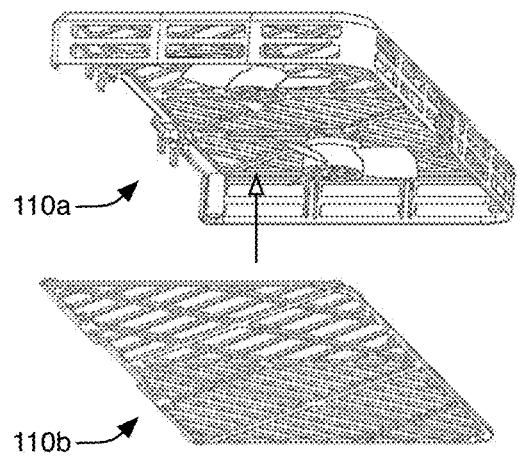
FIG. 3 is a specific example of the detachable housing and method of removal and replacement
Figure 9:
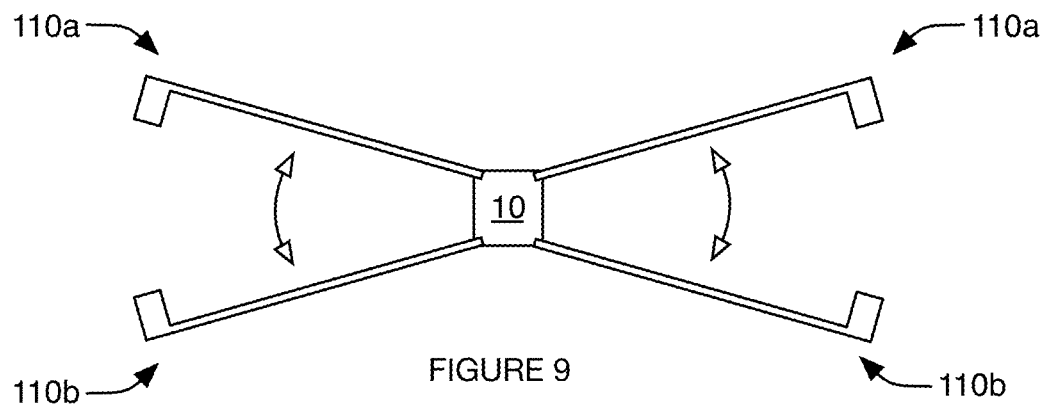
Figure 10:
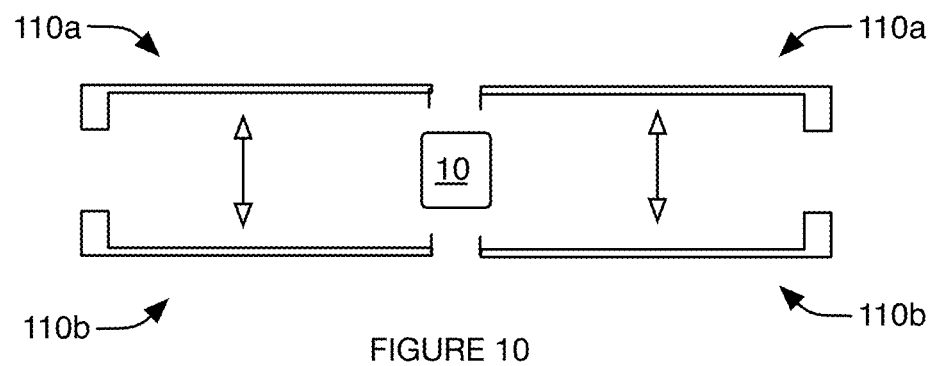

The first and/or second piece is preferably detachable from the main body of the aerial system, but can alternatively be actuatably mounted to the main body (e.g., rotatably mounted with a hinge along a first edge or side), statically mounted to the main body, or otherwise mounted to the main body. In one variation, the housing piece is formed as a unitary unit with, screwed into, adhered to, or otherwise statically mounted to the main body (example shown in FIG. 8). In a second variation, the housing piece is transiently retained by the main body. In one example, the housing piece can include pins that insert into complimentary holes in the main body (e.g., along the main body side, top, bottom, etc), specific examples shown in FIG. 3 and FIG. 10. In this example, the housing piece position relative to the body and/or other housing piece can be retained by the retention force generated by the retention mechanism, by the friction generated by an interference fit between the pin and main body housing, by a moment generated between the pin and remainder of the housing, or by any other suitable force. In a third variation, the housing piece is rotatably retained against the main body by a hinge (example shown in FIG. 9), tongue and groove (e.g., with a circular cross-section), or by any other suitable rotary retention mechanism.

Figure 8:
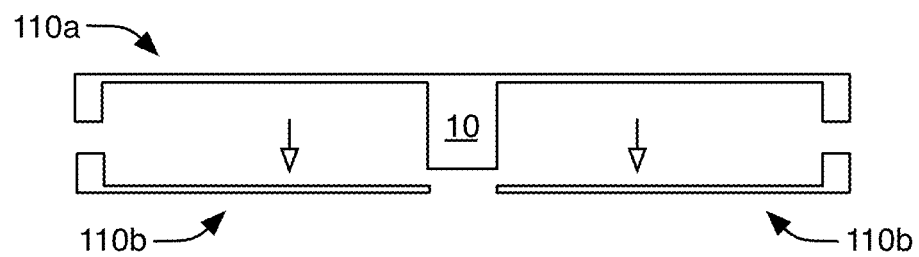

In one variation, the first piece (e.g., mounting the motor) is mounted to the main body, while the second piece is removably coupled to the main body by the retention mechanism (example shown in FIG. 8). In a second variation, the first and second pieces are both mounted to the main body, wherein the first and/or second piece can actuate relative to the main body (e.g., rotatably coupled, such that the first and second piece form a clamshell, etc.) (example shown in FIG. 9). In a third variation, both the first and second piece can be removably coupled to the main body (example shown in FIG. 10). In this variation, either the first, second, or both pieces can include a main-body mounting mechanism, such as alignment pins that insert into the main body, a hinge (e.g., wherein a pin aligns and establishes the rotational axis), a tongue-and-groove mechanism, a magnetic retention mechanism, and/or any other suitable mounting mechanism that connects the housing to the main body. However, the housing can be otherwise mounted to the main body.

The first and second piece preferably cooperatively form an interior volume such as a lumen, but can form any other suitable cavity configured to overlap a projection of the propeller swept area. The propellers and motors are preferably arranged within the lumen, but can be otherwise arranged. The motor can be mounted to the first piece of the detachable housing on a mounting surface. Alternatively, the motor can be mounted to a frame extending into the lumen (e.g., from the main body). Each propeller can be mounted to the respective motor (e.g., statically mounted to the respective motor), wherein the propeller can be separated by a separation distance from the housing surface opposing the mounting surface. Alternatively, the propeller can be rotatably mounted to the surface of the housing opposing the motor (e.g., along the motor rotational axis), wherein the motor rotor can contact the propeller, or be otherwise mounted. Power and/or data can be routed along the housing to the motor (e.g., through the housing thickness; through the hinge using a rotary junction; etc.), or otherwise supplied. Each rotor can be mounted to the housing above the propeller (e.g., during flight, the mounting point is above the propeller relative to a gravity vector), below the propeller, and/or at any other suitable position.

Figure 5A:
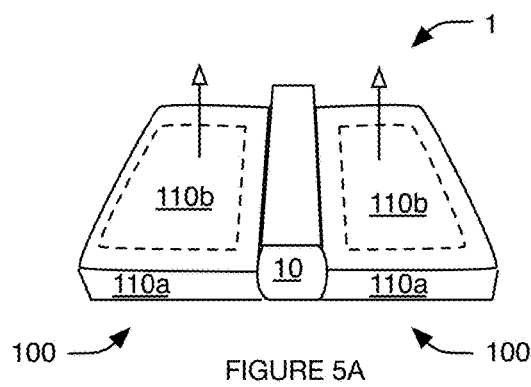
FIGS. 5A, 5B, 6A, and 6B are schematic examples of a first, second, third, and fourth variant, respectively, of the housing split into the first and second pieces.
Figure 6A:
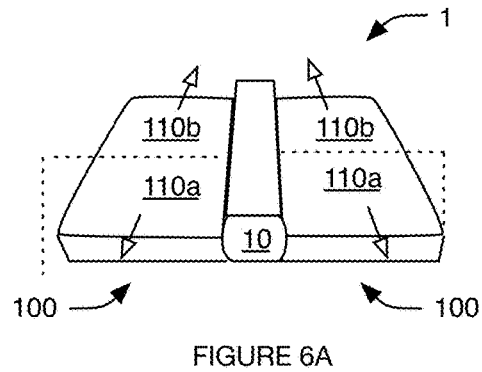
Figure 5B:
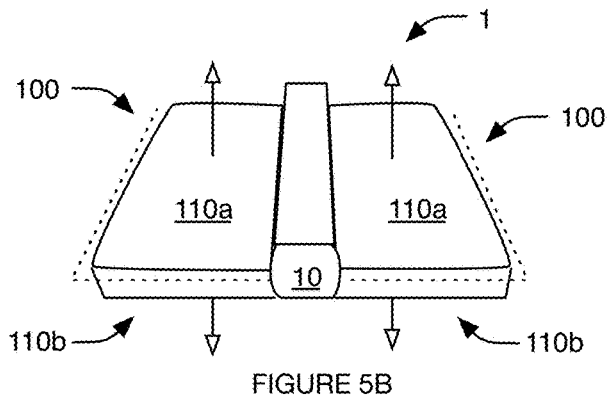
Figure 6B:
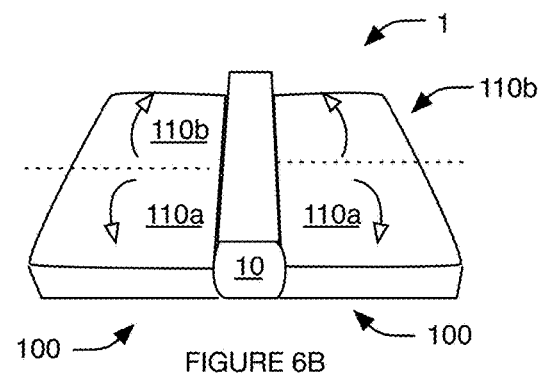

The housing is preferably split into a first and second piece, but can be split into any suitable number of pieces. The housing can be split into the first and second pieces along a plane, along a boundary, or otherwise split. The interface between the first and second pieces is preferably defined by the split, but the interface can be otherwise defined. The plane can extend: substantially (e.g., within an error margin, such as 5% of the ideal) parallel the swept area of the propellers, substantially perpendicular the propeller rotational axis, substantially parallel a broad face of the housing (examples shown in FIGS. 5A-5B), substantially perpendicular a broad face of the housing (examples shown in FIGS. 6A-6B), or in any other suitable orientation. The plane can extend through the broad face(s), the sidewalls, or through any other suitable housing surface. The second piece can nest entirely (e.g., along all edges) or partially (e.g., along a subset of opposing or contiguous edges) within the first piece (examples shown in FIGS. 3 and 5A), overlap entirely or partially with the first piece, or be otherwise related to the first piece. The first and second piece are preferably made from the same material, but can alternatively be made from different materials. Examples of materials that can be used include: carbon fiber, carbon composite, ferrous materials, metal, ceramic, plastic, or any other suitable material.

In one variation, the housing is split along a perimeter of a housing face. In a first embodiment of this variation, the first piece includes a first broad face and the housing sidewalls, and the second piece includes the second broad face. In one example of this embodiment, the interface extends perpendicular the second broad face (e.g., is defined along the second broad face), and can trace the second broad face boundary (example shown in FIG. 5A). In a second embodiment, the first piece includes the first and second broad face, and the second piece includes a sidewall that nests within the overhang defined by the first and second broad faces. In a second variation, the interface extends parallel an axis of the housing. In a first embodiment of the second variation, the interface extends along the second broad face (e.g., is defined along the sidewalls). In a first example of the second variation, the housing is split along a median axis (e.g., wherein the plane extends perpendicular the first and second broad faces), such that an end of the housing functions as an end cap. In a third variation, a face of the housing is split into two pieces, while the remainder of the housing remains intact. In one example, the second broad face can be split along the center into two pieces (e.g., hinged to the remainder of the housing), such that the second broad face forms a door into the lumen. However, the housing can be otherwise split.

The retention mechanism of the detachable housing preferably functions to removably couple the first piece to the second piece. The retention mechanism is preferably arranged along the interface between the first piece and the second piece, but can alternatively or additionally be arranged proximal the interface (e.g., beside the interface), span the interface, or be otherwise arranged. The retention mechanism can be embedded within the housing body (e.g., be magnets embedded within the body), formed as a unitary piece with the housing body (e.g., be clips machined or molded with the housing body), substantially permanently mounted to the housing body (e.g., using adhesive, screws, etc.), removably mounted to the body, or otherwise coupled to the housing body.

The detachable housing preferably includes multiple sets of retention mechanisms (e.g., 3 sets, 4 sets, etc.), but can alternatively include one set of retention mechanisms or any suitable number of retention mechanisms. The retention mechanism(s) is preferably substantially evenly distributed across the housing (e.g., one per side, separated by substantially equal distances, distributed symmetrically, etc.), but can alternatively or additionally be unevenly distributed, or otherwise distributed. In one example, the retention mechanism is arranged along the edge opposing a hinged edge of the housing piece. In a second example, the retention mechanism is located in the corners of the housing piece. In a third example, the retention mechanism is centered along opposing edges of the housing piece. In a fourth example, the retention mechanism is centered along each edge of the housing piece. However, the retention mechanism can be otherwise arranged.

The retention mechanism 120 preferably includes a first mechanism 120a and second mechanism 120b (example shown in FIG. 2), but can alternatively include any suitable number of mechanisms. In one variation, the housing piece functions as one of the mechanisms. In a second variation, the housing piece includes auxiliary pieces, separate from the housing piece, the functions as the retention mechanism. The mechanisms of the retention mechanism are preferably arranged in complimentary positions on the first and second pieces (e.g., aligned when the first and second pieces are coupled together), but can alternatively be mismatched or otherwise aligned.

The first and second mechanisms preferably cooperatively generate a retention force that retains the first piece against the second piece, but can additionally or alternatively perform any other suitable functionality. The retention force is preferably greater than the weight of the bottommost piece (e.g., the first piece or the second piece), but can alternatively be substantially equal to or less than the weight of the bottommost piece. However, the first and second mechanisms can cooperatively generate any other suitable retention force.

The first and second mechanisms are preferably mounted to the first and second pieces of the housing, respectively, but can alternatively be mounted to the second and first pieces of the housing, respectively, or be otherwise mounted.

Figure 11:
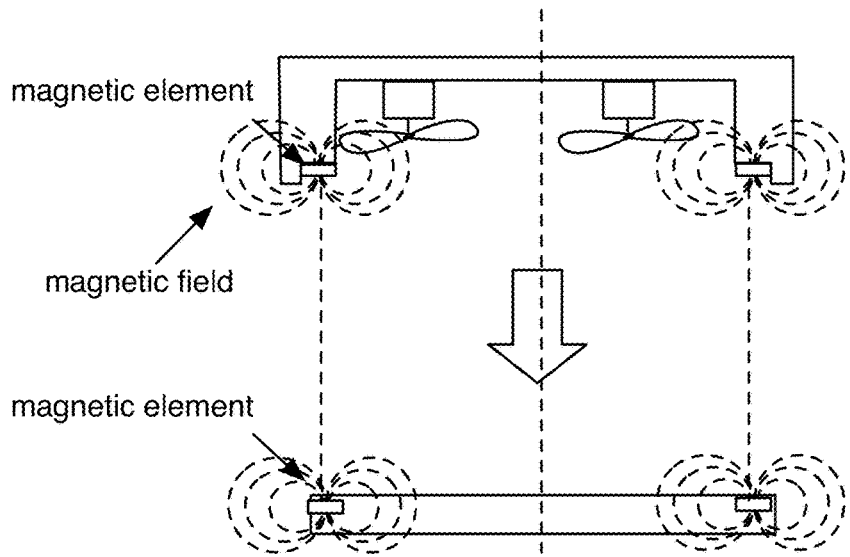
FIG. 11 is a schematic representation of a variation of the magnetic retention mechanism.
Figure 14:
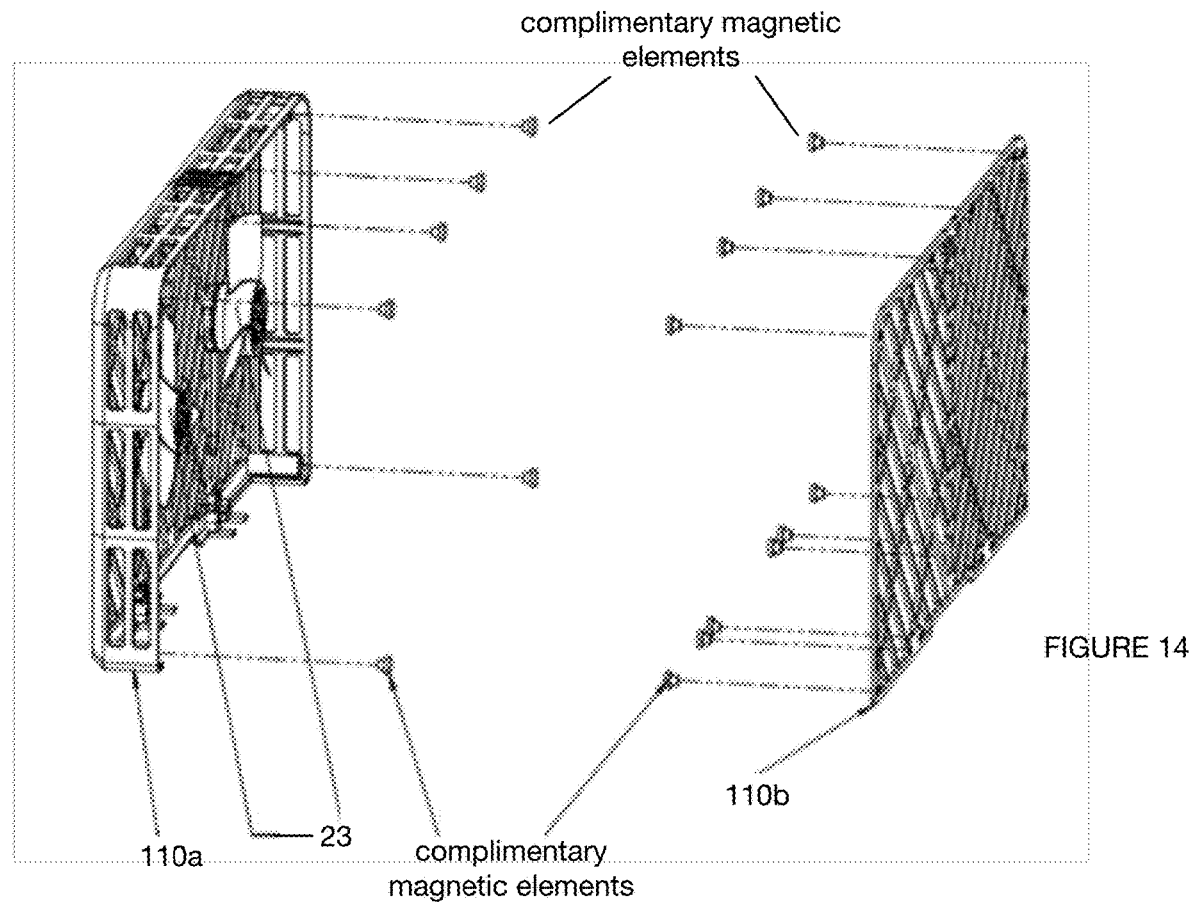
FIG. 14 is an exploded representation of an example of the first and second magnetic mechanisms of the first and second pieces.
Figure 15:
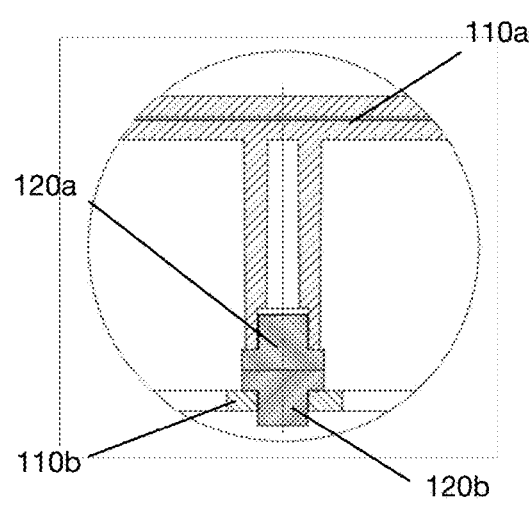
FIGS. 15 and 16 are cutaway views of examples of magnetic element mounting to the first and second pieces, respectively.
Figure 16:
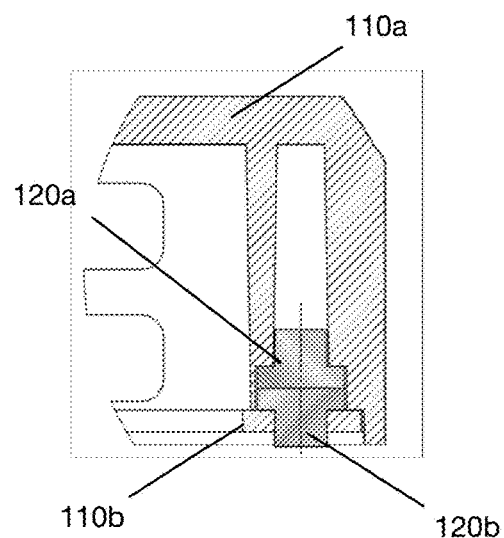

In a first variation, as shown in FIG. 11, the retention mechanism includes a magnetic element, wherein the retention force is a magnetic attractive force. The magnetic element can be a permanent magnet, an electromagnet (e.g. controlled by the processing system of the aerial system and/or otherwise controlled), or be any other suitable magnetic element. In a specific example, the magnetic element can have a T-shaped cross section, wherein the center leg of the T can be inserted into and adhered to a channel or hole (e.g., through hole, blind hole, etc.) defined in the housing piece (e.g., as shown in FIGS. 14-16). The T-shaped cross section can function to increase the housing adhesion surface and/or increase the amount of magnetic force generated by the magnet. However, the magnet can be otherwise configured.

Figure 12:
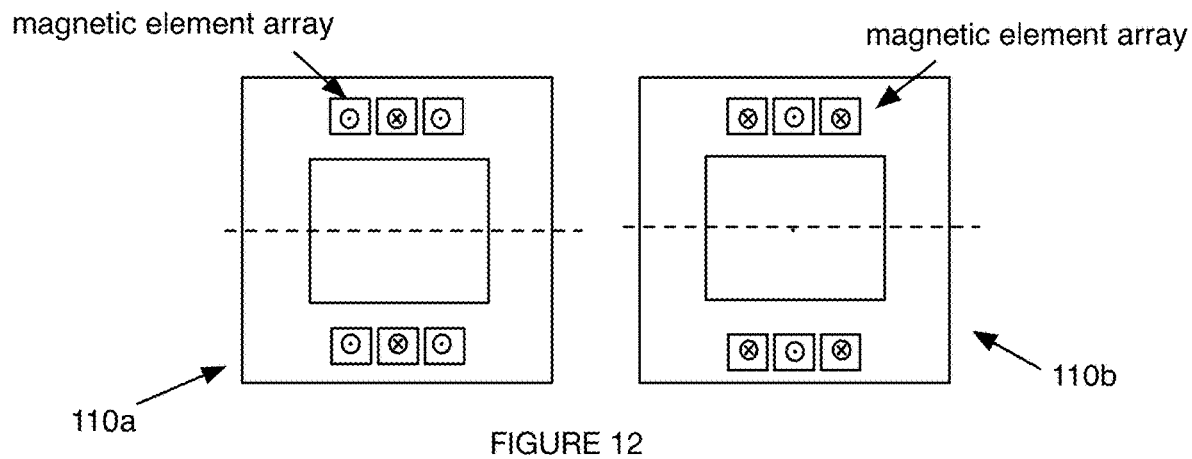
FIG. 12 is a schematic representation of an example of the first and second magnetic arrays of the first and second pieces.
Figure 13:
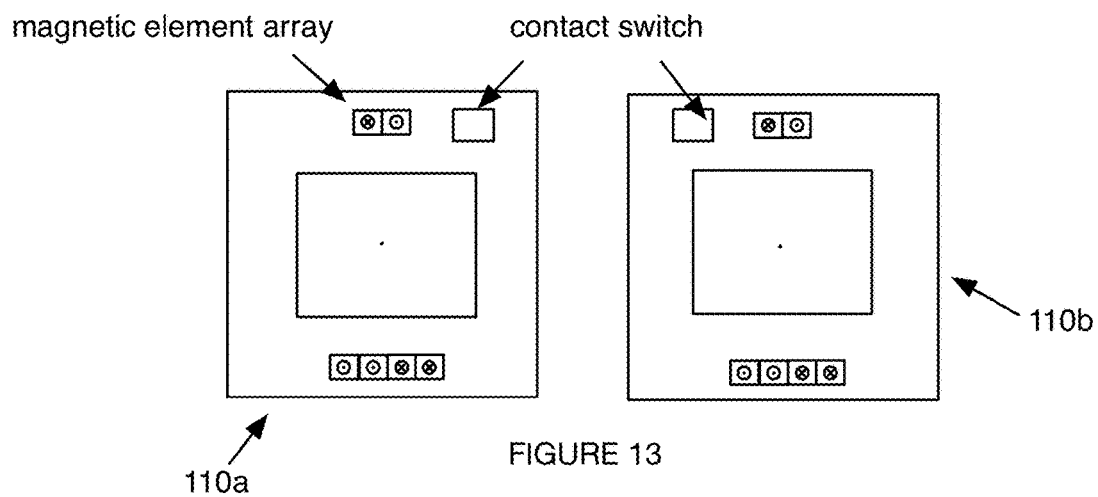
FIG. 13 is a schematic representation of a second example of the first and second magnetic arrays of the first and second pieces.

In a first embodiment, the first mechanism includes a magnetic element, and the second mechanism includes a ferrous plate. In a second embodiment, the first mechanism includes a first magnetic element biased at a first magnetic orientation (e.g., positive, North pole outward, etc.), and the second mechanism includes a second magnetic element biased at a second magnetic orientation opposing the first magnetic orientation (e.g., negative, South pole outward, etc.). For example, the first and second magnetic elements can define complimentary magnetic moments (e.g., substantially parallel moments; moments defining an angle between themselves less than a threshold angle, such as 1°, 2°, 5°, 10°, 15°, 25°, 45°, 60°, 90°, 0-5°, 5-30°, 30-90°, etc.; moments with a dot product greater than zero; configured to generate an attractive magnetic force between the first and second magnetic elements; etc.). In a third embodiment, the first mechanism includes a first array of magnetic elements (e.g., wherein each sequential magnetic element within the array has a different magnetic orientation, such as substantially opposite orientations, magnetic moments defining a dot product less than and/or equal to zero, etc.; wherein some elements of the array, such as some adjacent elements, have substantially aligned magnetic orientations, and other elements of the array, have different orientations, such as substantially opposing orientations; etc.), and the second mechanism includes a second array of magnetic elements, wherein the second array of magnetic elements is complimentary to (e.g., opposes; is configured to generate an attractive magnetic force between the first and second arrays; define magnetic moments such as described above regarding the second embodiment; etc.) the first array of magnetic elements. The array can include an odd or even number of magnetic elements (example shown in FIG. 13). For example, as shown in FIG. 12, the first array can include an alternating pattern of positive, negative, positive, while the second array can include an alternating pattern of negative, positive, negative. The array can be linear, circular, or otherwise configured.

The mechanisms can optionally include additional magnetic elements and/or arrays (e.g., arranged in a complementary manner, such as configured to be arranged near each other and generate an attractive magnetic force between each other when the housing pieces are assembled). For example, the first and second housing piece can each include two or more magnetic elements or arrays (e.g., inner array and outer array, front array and rear array, etc.), each arranged on opposing sides of the respective housing piece (e.g., across a rotor axis, housing central plane, etc.).

The arrays can optionally be arranged to preclude housing assembly (e.g., mating of the first and second housing piece) in orientations other than a predefined desired orientation (e.g., as described below regarding the piece alignment mechanism). For example, a first housing piece inner array can be configured to exert an attractive magnetic force on a second housing piece inner array when the housing is assembled in the desired orientation (e.g., wherein the magnetic moments of mating elements have dot products greater than zero, such as being substantially aligned), but exert a repulsive magnetic force (e.g., on a second housing piece outer array, such as when the second housing piece is rotated about the rotor axis; on a second housing piece inner array, such as when the second housing piece is flipped over about an in-plane axis; etc.) when the housing is assembled in an incorrect orientation (e.g., wherein the magnetic moments of mating elements have dot products less than zero, such as being substantially anti-parallel). However, the magnetic elements can additionally or alternatively have any other suitable arrangement.

In a second variation, the retention mechanism includes a latch or clip, wherein the retention force is a latch force, example shown in FIG. 17. In this variation, the first mechanism can be a latch, and the second mechanism can be a groove, hook, or other latching point. The latch can include: a deadbolt, spring latch, slam latch, cam lock, Norfolk latch, hook, compression latch, rotary latch, or any other suitable latching mechanism.

In a third variation, the retention mechanism can be a tongue and groove mechanism, wherein a portion of the first piece physically retains the second piece. In this variation, the longitudinal axis of the tongue and groove mechanism is preferably arranged perpendicular a gravity vector (e.g., during aerial system flight), but can be otherwise arranged. In one example, the tongue is defined along the interface of the first piece and the groove is defined along the interface of the second piece. In a second example, the tongue is defined along the interface of the first piece and the groove is defined along a face opposing the interface of the second piece, wherein the tongue hooks into the groove and is rotated around to retain the relative positions between the first and second pieces. However, the tongue and groove interface can be otherwise arranged. In a first embodiment, the groove is a T-slot and the tongue is complimentary to the T-slot. In a second embodiment, the groove defines a longitudinal hook and the tongue includes a bar extending from the respective housing piece body. However, the tongue and groove can be otherwise configured.

However, the retention mechanism can additionally or alternatively include adhesive, van der Waals forces, hydrostatic forces, screws (e.g., configured to be retained by a threaded receptacle, such as a nut or tapped hole, of the first housing piece and arranged within a slot or through-hole of the second housing piece, thereby coupling the first and second housing pieces), or any other suitable retention mechanism.

Figure 4:
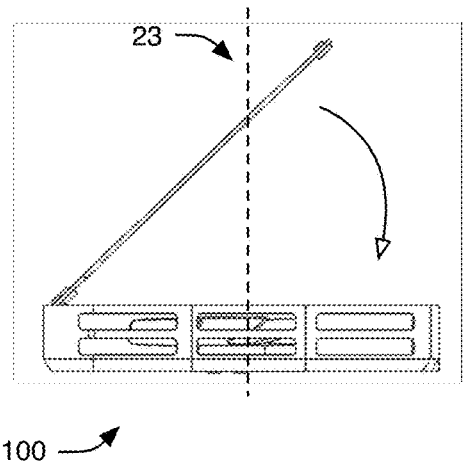
FIG. 4 is a specific example of detachable housing removal and replacement.

The detachable housing can optionally include a piece alignment mechanism that functions to align the first and second pieces. The first and second pieces can be aligned along an alignment axis (e.g., rotationally coupling the first and second pieces about the axis, such as shown in FIG. 4), be rotationally aligned, or be otherwise aligned by the alignment mechanism. This can function to create a substantially closed lumen, a desired weight distribution (e.g., substantially even weight distribution), form electrical connections (e.g., wherein both the first and second pieces are electrically connected to powered components), or perform any other suitable functionality. The piece alignment mechanism can be particularly useful in applications with a loose housing piece (e.g., a housing piece that is not mounted to the main body), but can alternatively be useful in any other suitable housing configuration. The piece alignment mechanism is preferably arranged along the interface, but can alternatively be arranged along an edge opposing the interface, or along any other suitable portion of the housing pieces.

In a first variation, the piece alignment mechanism includes the retention mechanism. In one embodiment, the retention mechanism can include a first and second set of magnetic elements distributed along the interface between the first and second piece, wherein the magnetic forces generated by the first and second magnetic element sets align the first and second piece. In one example, the first and second set of magnetic elements can have opposing polarities (e.g., wherein the first piece includes a positive magnet of the first set and a negative magnet of the second set, and the second piece includes a negative magnet of the first set and a positive magnet of the second set), such that the retention mechanisms rotationally aligns the first and second pieces. In a second example, the first and second magnetic element sets each include a magnetic element array with alternating polarities, wherein the polarity pattern formed by each array is preferably different, but can alternatively be the same. However, the retention mechanism can otherwise align the housing pieces.

Figure 7:
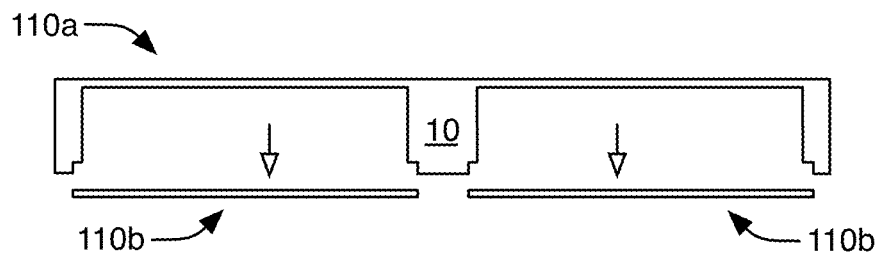
FIGS. 7-10 are schematic examples of a first, second, third, and fourth variant, respectively, of the relationship between the main body and the first and second pieces.

In a second variation, the piece alignment mechanism includes portions of the first and/or second piece. In a first embodiment, the piece alignment mechanism includes the walls of the first piece, wherein the second piece nests within the walls of the first piece. In this embodiment, the walls can optionally define a ledge (e.g., pocket) that halts second piece insertion into the lumen defined by the first piece (e.g., as shown in FIG. 7 and/or FIG. 16). In this embodiment, the retention mechanism can be arranged on the ledge, along the walls, over a surface of the second piece distal the lumen, or otherwise arranged. In a second embodiment, the piece alignment mechanism can be an asymmetric profile of the first and/or second piece. For example, the second piece can include an asymmetrically positioned key (e.g., parallel the broad face of the second piece, perpendicular the broad face of the second piece, etc.) that fits into a complimentary groove in the first piece. However, the housing pieces can define any other suitable set of alignment mechanisms.

In a third variation, the piece alignment mechanism includes a separate feature on the housing pieces. In one embodiment, shown in FIG. 18, the alignment feature includes a tongue and groove feature, wherein tongue alignment with the groove aligns the first and second pieces. The tongue and groove can be arranged along an edge of the housing pieces, a broad face of the housing pieces, or along any other suitable surface. In a second embodiment, the alignment feature includes a hinge rotationally coupling the first and second housing pieces about a hinge axis (e.g, axis substantially perpendicular a rotor axis, axis substantially parallel an edge and/or broad face of the first and/or second housing piece, etc.). For example, the hinge and retention mechanism (e.g., magnetic element) can be arranged near opposing edges of the housing pieces (e.g., opposing each other across the rotor axis).

In a fourth variation, the piece alignment mechanism includes the main body. In one embodiment, one or both of the housing pieces are substantially permanently connected to the main body. In one example, the first and second pieces are hinged along an edge to the main body, wherein the hinge constrains the first and second pieces' degrees of freedom to rotational freedom only. In a second example, the first piece is statically mounted to the main body, wherein the first piece and/or side of the main body cooperatively align the second piece. In a third example, the relative positions of the first piece and second piece are retained by the main body, while the first and second pieces are coupled together by the retention mechanism. However, the main body can otherwise align the first and second pieces.

The detachable housing can optionally include a contact switch (e.g., contact sensor) that functions to determine whether the first and second housing pieces are properly coupled. The contact switch is preferably electrically connected to the processing system of the aerial system, but can be otherwise connected. In one variation, the processing system can prevent aerial system flight (e.g., prevent propeller actuation) in response to determination that the contact switch is in an open position, indicative of housing piece absence and/or misalignment. However, the contact switch can be otherwise used.

The contact switch is preferably arranged along the interface (example shown in FIG. 19), but can be arranged in any other suitable location. The detachable housing can include one contact switch, multiple contact switches, or any other suitable number of contact switches. The contact switches are preferably substantially evenly distributed about the housing (e.g., determine whether the housing is aligned on opposing sides), but can alternatively be asymmetrically positioned or otherwise arranged. The contact switch can be the retention mechanism, the same element as the alignment mechanism (e.g., wherein the contact switch is arranged along the bearing surface of a tongue-and groove alignment mechanism, etc.), be a separate element, or be any other suitable element.

In a first variation, the contact switch can include a first and second conductive plate arranged along complimentary interfaces of the first and second pieces, respectively, such that proper first and second piece alignment completes a circuit. The conductive plates can be connected to the processing system through electrical circuits routed through the respective housing piece thickness (example shown in FIG. 19), extending along a surface of the respective housing piece, or otherwise connected to the processing system. The conductive plates are preferably smaller than the interface surface, such that housing piece misalignment results in an open circuit. However, the conductive plates can be otherwise configured.

In a second variation, the contact switch can include the retention mechanism. For example, the retention mechanism can include an electromagnet that doubles as the contact switch. In operation, the circuit can be considered closed in response to induced current detection in the electromagnet windings (e.g., wherein the current is induced by the opposing magnet). However, the retention mechanism can be otherwise used as the contact switch.

The detachable housing can optionally include a removal mechanism that functions to facilitate housing detachment. In a first variation, the removal mechanism includes a gap in the removable housing piece. The gap can be defined along the removable housing piece's edge, in the main body of the removable housing piece, or be otherwise located. The gap preferably opposes the edge mounting the retention mechanism, but can alternatively be defined along an edge adjacent the retention mechanism, be defined along the edge mounting the retention mechanism, or be any other suitable edge. In a second variation, the removal mechanism includes a groove along a side of the housing piece that facilitates user grip. The groove is preferably perpendicular the retention grip, but can alternatively be parallel the retention force or otherwise defined. In a third variation, the removal mechanism is a custom tool (e.g., custom screwdriver head or key, etc.) that mates with a custom fastener (e.g., custom screw). However, the removal mechanism can be any other suitable mechanism.

The housing (e.g., the frame described in U.S. application Ser. No. 15/349,749, titled "System and Method for Automated Aerial System Operation", which is incorporated in its entirety by this reference) preferably includes one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system to move throughout the ambient environment). The apertures can be elongated, can have comparable length and width, and/or have any other suitable shape. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight (e.g., greater than a threshold percentage such as 30%, 50%, 60%, 70%, 75%, 80%, 85%, 90%, 95%, 98%, 30-70%, 70-100%, etc.), more preferably enabling high-performance flight maneuvering. For example, each aperture can be smaller than a threshold size (e.g., smaller than the threshold size in all dimensions, elongated slots narrower than but significantly longer than the threshold size, etc.; threshold size such as 1 mm, 3 mm, 7 mm, 10 mm, 12 mm, 14 mm, 16 mm, 20 mm, 30 mm, 50 mm, 1-5 mm, 5-10 mm, 10-20 mm, 20-50 mm, etc.). In a specific example, the frame has a geometrical transparency of 80-90%, and the apertures (e.g., circles, polygons such as regular hexagons, etc.) each define a circumscribed circle with a diameter of 12-16 mm. However, the housing can additionally or alternatively include any other suitable apertures and/or other airflow elements.

When the housing is assembled (e.g., the first and second housing pieces are retained together by the retention mechanism, the housing is in an "assembled" or "enclosing" mode, etc.), the propellers preferably cannot be removed from the interior volume (e.g., the lumen). For example, the apertures (e.g., airflow apertures) can be small enough that the propellers cannot pass through any of the apertures. In contrast, when the housing is disassembled (e.g., the first and second housing pieces are detached, the housing is in a "disassembled" or "open" mode, etc.), the housing preferably does not preclude removal of the propellers from the interior volume (e.g., thereby enabling maintenance and/or replacement of the propellers). However, the housing can additionally or alternatively function in any other suitable manner.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. An aircraft comprising:
   a housing comprising:
      a first housing piece comprising a first fastener; and
      a second housing piece comprising a second fastener, the second fastener removably coupled to the first fastener, wherein the first fastener and the second fastener cooperatively retain the first housing piece against the second housing piece, wherein the first housing piece and the second housing piece cooperatively define an interior volume; and
   a rotor comprising:
      a propeller arranged within the interior volume; and
      a motor rotationally coupling the propeller about a first rotor axis to the first housing portion;
   wherein:
      the housing further comprises a hinge rotationally coupling the first housing piece to the second housing piece about a hinge axis;
      the hinge axis is substantially perpendicular to the first rotor axis; and
      the hinge axis opposes the first magnet and the second magnet across the first rotor axis.

2. The aircraft of claim 1, further comprising a second rotor, the second rotor comprising:
   a second propeller arranged within the interior volume; and
   a second motor rotationally coupling the propeller about a second rotor axis to the first housing portion, wherein the second rotor axis is substantially parallel the first rotor axis.

3. The aircraft of claim 1, wherein:
   the motor is arranged within the interior volume; and
   the propeller is removably coupled to the motor.

4. The aircraft of claim 1, wherein:
   the propeller defines a swept volume;
   the first housing portion defines a first grab region, the first grab region comprising a projection of the swept volume onto the first housing portion along the first rotor axis; and
   the second housing portion defines a second grab region, the second grab region comprising a projection of the swept volume onto the second housing portion along the first rotor axis.

5. The aircraft of claim 4, wherein the housing defines a plurality of airflow apertures fluidly coupling the interior volume to an ambient environment, wherein each airflow aperture of the plurality defines a respective aperture size smaller than a threshold size.

6. The aircraft of claim 5, wherein the threshold size is 20 mm.

7. The aircraft of claim 1, wherein the first magnet is a first permanent magnet and the second magnet is a second permanent magnet.

8. The aircraft of claim 1, wherein:
   the first magnet defines a first magnetic moment;
   the second magnet defines a second magnetic moment, wherein the dot product of the first magnetic moment and the second magnetic moment is greater than zero;
   the first housing piece further comprises a third magnet defining a third magnetic moment, wherein the dot product of the first magnetic moment and the third magnetic moment is less than zero; and
   the second housing piece further comprises a fourth magnet removably coupled to the third magnet by a magnetic force, the fourth magnet defining a fourth magnetic moment, wherein the dot product of the second magnetic moment and the fourth magnetic moment is less than zero.

9. The aircraft of claim 1, wherein:
   the first housing piece further comprises a first contact sensor element;
   the second housing piece further comprises a second contact sensor element; and
   the first fastener and the second fastener cooperatively retain the first contact sensor element against the second contact sensor element.

10. The aircraft of claim 1, wherein:
    the first housing piece defines a pocket; and
    the first fastener and the second fastener cooperatively retain the second housing piece against the first housing piece within the pocket.

11. A method for aircraft operation, comprising:
    at an aircraft comprising a housing and a propeller rotationally coupled to the housing about a rotor axis, while the housing is configured in an enclosing configuration wherein the housing encloses the propeller, operating in a flight mode, comprising rotating the propeller about the rotor axis;
    after operating in the flight mode, transitioning the housing from the enclosing configuration to an open configuration;
    after transitioning the housing to the open configuration, replacing the propeller, comprising:
       detaching the propeller from the housing; and
       attaching a replacement propeller to the housing, thereby rotationally coupling the replacement propeller to the housing substantially about the rotor axis; and
    after replacing the propeller, transitioning the housing from the open configuration to the enclosing configuration, wherein the housing encloses the replacement propeller in the enclosing configuration.

12. The method of claim 11, further comprising, after transitioning the housing to the enclosing configuration, operating in the flight mode, comprising rotating the replacement propeller substantially about the rotor axis.

13. The method of claim 12, further comprising:
    before transitioning the housing from the open configuration to the enclosing configuration, at a housing sensor of the housing, sampling a first measurement indicative of the housing being in the open configuration;
    in response to sampling the first measurement, preventing operation in the flight mode; and
    after preventing operation in the flight mode, at the housing sensor, sampling a second measurement indicative of the housing being in the enclosing configuration; wherein rotating the replacement propeller is performed in response to sampling the second measurement.

14. The method of claim 11, wherein, while operating in the flight mode:
    the propeller is coupled to the housing at a mounting point of the housing; and
    propeller is below the mounting point along a gravity vector.

15. The method of claim 11, wherein:
    the propeller defines a swept volume;

the housing defines a region consisting of a projection of the swept volume onto the housing along the rotor axis; and the method further comprises, concurrent with rotating the propeller about the rotor axis, holding the housing at the region with a human hand.

16. The method of claim 11, wherein:

the housing comprises:
   a first housing piece comprising a first fastener; and
   a second housing piece comprising a second fastener;

in the enclosing configuration, the second fastener is removably fastened to the first fastener, thereby retaining the first housing piece against the second housing piece;

transitioning the housing from the enclosing configuration to the open configuration comprises separating the first housing piece from the second housing piece; and transitioning the housing from the open configuration to the enclosing configuration comprises removably fastening the second fastener to the first fastener.

17. An aircraft comprising:

a housing comprising:
   a first housing piece comprising a first fastener, wherein the first fastener comprises a threaded receptacle; and
o a second housing piece comprising a second fastener, the second fastener removably coupled to the first fastener, wherein the second fastener comprises a screw retained within the threaded receptacle, wherein the first fastener and the second fastener cooperatively retain the first housing piece against the second housing piece, wherein the first housing piece and the second housing piece cooperatively define an interior volume; and a rotor comprising:
   a propeller arranged within the interior volume; and
   a motor rotationally coupling the propeller about a rotor axis to the first housing portion;

wherein:
   the propeller defines a swept volume;
   the first housing portion defines a first grab region, the first grab region comprising a projection of the swept volume onto the first housing portion along the rotor axis; and
   the second housing portion defines a second grab region, the second grab region comprising a projection of the swept volume onto the second housing portion along the rotor axis.

18. The aircraft of claim 1, wherein the first fastener comprises a first magnet, the second fastener comprises a second magnet, and the first magnet is removably coupled to the second magnet by a magnetic force.

* * * * *